United States Patent [19]

Hamano et al.

[11] Patent Number: 4,697,781
[45] Date of Patent: Oct. 6, 1987

[54] DYNAMIC DAMPER

[75] Inventors: Hideo Hamano; Keiji Takeshita; Yasumichi Funato, all of Toyota, Japan

[73] Assignee: Toyota Jidosha Kabushiki Kaisha, Toyota, Japan

[21] Appl. No.: 916,745

[22] Filed: Oct. 8, 1986

[30] Foreign Application Priority Data

Oct. 18, 1985 [JP] Japan .................. 60-159711[U]

[51] Int. Cl.$^4$ ............................................. F16F 7/10
[52] U.S. Cl. ................................. 248/559; 188/379
[58] Field of Search ............ 248/559, 562, 636, 638, 248/550, 610–612; 267/140.1, 141, 141.6; 188/378, 379

[56]  References Cited

U.S. PATENT DOCUMENTS

| 3,388,772 | 6/1968 | Marsh | 188/379 |
| 3,872,950 | 3/1975 | Ashfield | 188/379 |
| 4,428,569 | 1/1984 | Takei | 248/636 |
| 4,632,372 | 12/1986 | Nakaima | 248/562 |
| 4,648,579 | 3/1987 | Wilson | 248/638 |

FOREIGN PATENT DOCUMENTS 56157441  4/1955  Japan .

Primary Examiner—Reinaldo P. Machado
Assistant Examiner—Alvin Chin-Shue
Attorney, Agent, or Firm—Oblon, Fisher, Spivak, McClelland & Maier

[57] ABSTRACT

A dynamic damper includes a metallic weight having a predetermined resonance frequency, a support member to be connected to an oscillating member in a vehicle to which the damper is applied, a rubber resilient member bonded by vulcanization to the metallic weight and the support member, a cover member attached to the support member in fluid-tight sealing relation thereto and encircling the support member, the resilient member and a part of the metallic weight, and a membrane secured on the metallic weight, a peripheral end portion of which is in fluid-tight contact with an inner peripheral wall surface of the cover member and is slidable therealong.

6 Claims, 5 Drawing Figures

DYNAMIC DAMPER

FIELD OF THE INVENTION AND RELATED ART STATEMENT

The present invention relates generally to a dynamic damper adapted to be mounted onto an oscillating member or part of a vehicle, and more particularly to a dynamic damper for damping an oscillation of a member by oscillating an incorporated weight in out of phase with such oscillating member.

The conventional such dynamic damper includes a support member to be mounted to an oscillating member, a weight and a rubber resilient member interposed between the support member and the weight and adapted to be elastically deformed so as to oscillate the weight in out of phase with the oscillating member. The rubber resilient member is bonded to the support member and the weight by vulcanization or the like. The dynamic damper, in use, is entirely exposed to an external atmosphere. Accordingly, such conventional dynamic damper has frequently encountered the problems that the rubber resilient member is susceptible to corrosion under influence of anti-icer distributed on the road or muddy water and to deterioration of bonding strength of vulcanized bonded portions.

In case that the rubber resilient member is corroded and/or the bonding strength of the vulcanized bonded portions is deteriorated, when the dynamic damper is subjected to significant oscillations, the weight may fall out from the damper. It is, therefore, feared that such weight damages nearby running vehicles.

Japanese Utility Model Unexamined Publication No. 56-157441 discloses a dynamic damper which is adapted to prevent the weight from falling out from the damper. In such damper, the weight presents a U-shape in cross section, and is hung at upper portions thereof from a leaf spring and carrys on a bottom thereof the weight. According to such dynamic damper, the weight is prevented from falling out from the damper. However, the constructions thereof becomes complex and the applicability thereof is limited.

OBJECT AND SUMMARY OF THE INVENTION

Accordingly, an object of the present invention is to provide a dynamic damper in which the resilient member is prevented from being deteriorated in strength thereof.

Another object of the present invention is to provide a dynamic damper which prevents the weight from damaging nearby running vehicles even if the weight is detached from the support member.

To this end, according to the present invention, there is provided a dynamic damper which includes a cover member for encircling the support member, the weight and a resilient member disposed between the support member and the weight, and for providing at one end portion thereof a seal between the support member and the cover member. The dynamic damper further includes a resilient membrane being fixed onto the weight and having an outer periphery which is in fluid-tightly contact with an inner wall surface of the cover member. The resilient member is prevented from being subject to the atmosphere by the cover member and the membrane.

These objects and features of the invention will become more clear from a reading of the following description of the preferred embodiments with reference to the accompanying drawings.

Figure 1:
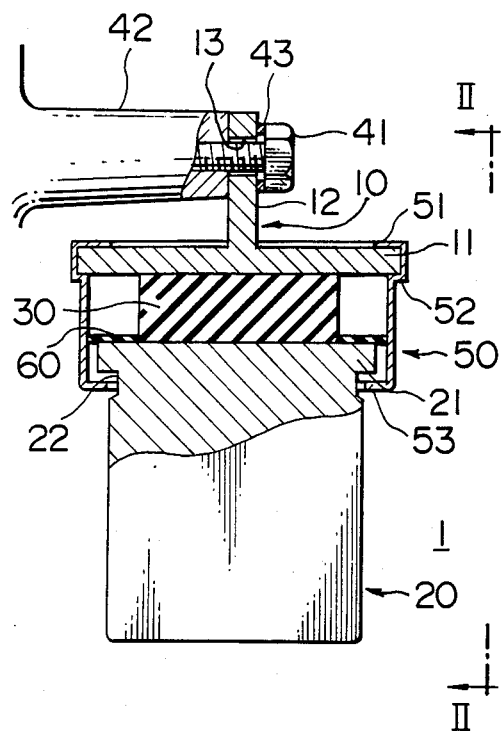
FIG. 1 is a front view partly in section showing one embodiment of the invention.
Figure 2:
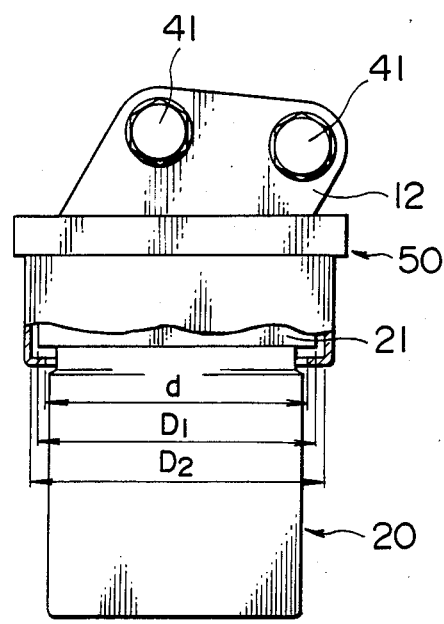
FIG. 2 is a side view taken along the line II—II of FIG. 1.

DETAILED DESCRIPTION OF PREFERRED EMBODIMENTS:

Referring to FIGS. 1 and 2, a dynamic damper generally indicated at 1 includes a support member 10, a metallic weight 20 and a rubber resilient member 30 interposed between the support member 10 and the weight 20.

The support member 10 includes a disk plate 11 and a projection 12 projecting from and integrally with the disk plate 11. The projection 12 is provided with two mounting holes 13. The support member 10 is secured to a proximal portion 42 provided in an oscillating member incorporated in a vehicle by screw-mounting bolts 41 into the proximal portion 42 through the mounting holes 13. The reference numeral 43 represents a washer.

The weight 20 is integrally provided at one end thereof with a disk-shaped flange 21 through a reduced portion 22 having a smaller diameter. The flange 21 extends circumferentially and radially outwardly from an outer periphery of the weight 20.

The rubber resilient member 30 presents a cylindrical shape and is interposed between the disk plate 11 of the support member 10 and the flange 21 of the weight 20. The rubber resilient member 30 is bonded to not only the disk plate 11 but the flange 21 through vulcanization and so on.

The dynamic damper 1, further, includes a hollow stepped cylindrical cover member 50 which encircles the support member 10, the resilient member 30 and the flange 21 of the weight 20. The cover member 50 is caulked at an end portion of greater diameter part thereof against a periphery of the disk plate 11 of the support member 10 for providing a fluid-tight sealing therebetween. The cover member 50 is so secured to the support member 10 that a peripheral edge portion of the disk plate 11 is sandwitched between the caulked portion and a should portion 52 of the cover member 50. The cover member 50 is folded at an end portion 53 of smaller diameter part thereof radially inwardly toward the reduced portion 22 of the weight 20 so that an inner dimension d of the folded end portion 53 is smaller than an outer diameter D1 of the flange 21 of the weight 20. Also, the cover member 50 is so designed that an inner diameter D2 of a portion of smaller diameter part thereof is greater that the outer diameter D1 of the flange 21 of the weight 20. Accordingly, the cover member 50 permits the weight 20 to reciprocate in an axial direction.

Onto the flange 21 of the weight 20 is bonded a closed loop shaped membrane 60 which is made of the same material as the resilient member 30. The membrane 60 has an inner diameter equal to or slightly greater than the outer diameter of the resilient member 30. The membrane 60 is so dimensioned that an outer peripheral edge thereof is in fluid-tight sealing contact with an inner wall surface of the portion of smaller diameter part of the cover member 50 while permits a slidable movement of the membrane 60 relative to the inner wall surface of the smaller diameter portion.

When an oscillation is occurred in an oscillating member incorporated in a vehicle to which the dynamic damper 1 is applied, such oscillation is transmitted to the weight 20 through the support member 10 and the resilient member 30. In this instant, there is generated an out of phase in oscillations between the oscillating member and the weight 20 due to elastic deformation of the resilient member 30. This phase difference serves to damp the oscillation of the oscillating member.

As apparent from the foregoing description, according to the present invention, the resilient member 30 is not exposed to external atmosphere, so that it is possible to avoid any adverse influence from external atmosphere. Accordingly, it can be possible to prevent the resilient member and the vulcanized bonded portion from deteriorating. Additionally, it is possible to always maintain the dynamic damper in optimum dynamic damping properties since the resilient member can be protected from muddy water whereby resulting in no change of elastic deformative properties in the resilient member. Even in cases where a heat source such as a muffler is positioned in the vicinity of the dynamic damper, the resilient member can be prevented from deterioration due to heat since the resilient member is not subjected to direct radiant heat.

Figure 3:
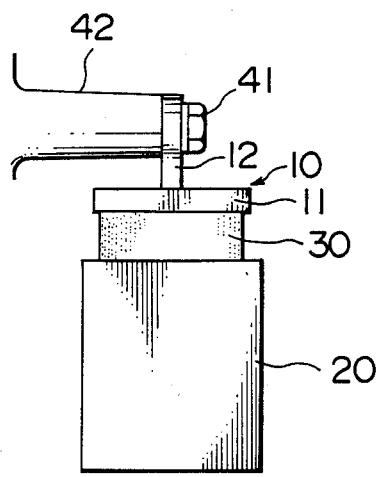
FIG. 3 is a front view showing a prior art dynamic damper.

In contrast, according to the conventional dynamic damper as shown in FIG. 3 (wherein parts or portions corresponding to those in FIG. 1 are identified by the same reference numerals, and the explanation thereof is omitted), there has involved the risk that the weight falls out from the damper because the resilient member and the vulcanized bonded connection are exposed to external atmosphere and are susceptible to deterioration.

Further, according to the present invention, even if the weight is detached from the resilient member, it will never fall out from the damper since the weight 20 is to be carried at the flange 21 thereof by the inwardly folded end portion 53 of the cover member 50. Thus, there will be no risk of causing damages to other vehicles.

Figure 4:
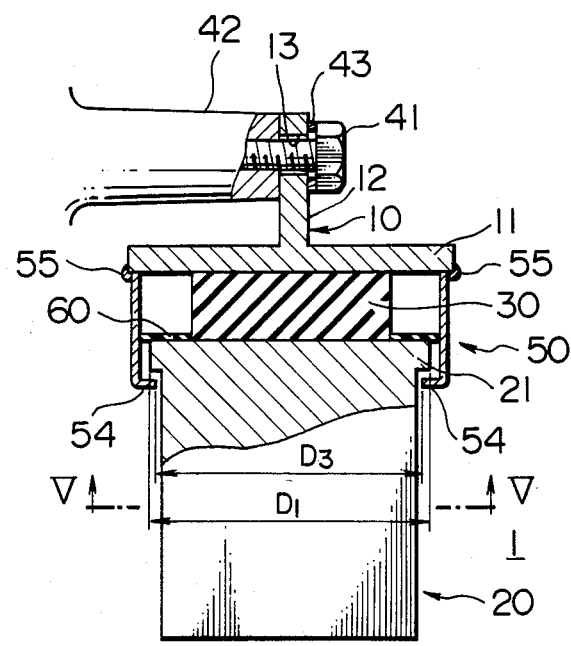
FIG. 4 is a front view partly in section showing another embodiment of the invention.
Figure 5:
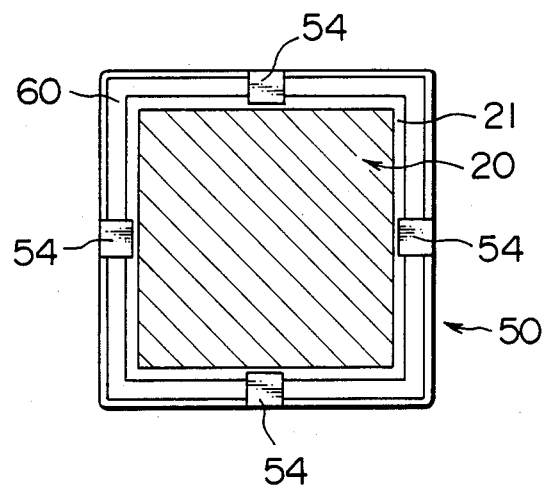
FIG. 5 is a cross sectional view taken along the line V—V of FIG. 4.

Still further, the members 11, 20, 30 and 60 are not limited in cross section thereof to circular but may to various cross-sectional configurations. FIGS. 4 and 5 show another embodiment of the invention wherein members 11, 20, 30 and 60 of rectangular cross-sections are employed. In this embodiment, the cover member 50 is provided at end portion thereof with four projecting segments 54 projecting radially inwardly instead of the radially inwardly folded circumferential end portion 53 in the preceding embodiment. In this example, it is also possible to prevent the weight from falling out from the damper since a dimension D3 between the projections 54 is smaller than the outer dimension D1 of the flange 21 of the weight 20. Further, the fluidtight sealing between the cover member and the support member may alternatively be provided by welding 55 therebetween.

What is claimed is:

1. A dynamic damper comprising:
    a weight having a predetermined resonance frequency;
    a support member a part of which is to be connected to an oscillating member;
    a resilient member made of a resilient material, said resilient member disposed between said weight and said support member and fixed thereto;
    a hollow cover member for encircling said support member, said resilient member and at least a part of said weight, and for providing at one end portion thereof a seal between said support member and said cover member; and
    a membrane made of the same material as said resilient member, said membrane fixed at a part thereof on said weight and having an outer periphery being in fluid-tightly contact with an inner wall surface of said cover member while permitting a slidable movement of said membrane along said cover member.

2. A dynamic damper according to claim 1, wherein said weight is provided with a flange portion extending circumferentially and radially outwards from an outer periphery thereof, to which said resilient member is fixed, and wherein said cover member is provided at the other end portion thereof with at least two projections projecting radially inwards, an inner dimension therebetween being smaller than an outer dimension of said flange of said weight.

3. A dynamic damper according to claim 1, wherein said weight is provided with a flange portion extending circumferentially and radially outwards from an outer periphery thereof, to which said resilient member is fixed, and wherein said cover member is provided at the other end portion thereof with a flange extending circumferentially and radially inwards, and an inner dimension thereof being smaller than an outer dimension of said flange portion of said weight.

4. A dynamic damper according to claim 1, wherein said seal between said support member and said cover member is provided by caulking of said one end portion of said cover member.

5. A dynamic damper according to claim 1, wherein said seal between said support member and said cover member is provided by welding of said one end portion of said cover member to said support member.

6. A dynamic damper according to claim 1, wherein said resilient member is made of a high molecular substance and is fixed by vulcanization to said weight and said support member.

* * * * *